Sept. 2, 1969 J. P. BELTZ ET AL 3,465,130

RELIABILITY CHECK CIRCUIT FOR OPTICAL READER

Filed Aug. 30, 1965 2 Sheets-Sheet 1

INVENTORS
JOHN P. BELTZ &
DONALD E. PHELPS
BY John T. O'Halloran
Attorney

RELIABILITY CHECK CIRCUIT FOR OPTICAL READER

Filed Aug. 30, 1965 2 Sheets-Sheet 2

INVENTORS
JOHN P. BELTZ &
DONALD E. PHELPS

BY John T. O'Halloran
Attorney

United States Patent Office 3,465,130

Patented Sept. 2, 1969

3,465,130
RELIABILITY CHECK CIRCUIT FOR OPTICAL READER

John P. Beltz, Willingboro, and Donald E. Phelps, Haddonfield, N.J., assignors to RCA Corporation, a corporation of Delaware Filed Aug. 30, 1965, Ser. No. 483,710
Int. Cl. G06k 7/00
U.S. Cl. 235—61.11 8 Claims

ABSTRACT OF THE DISCLOSURE

An optical reader reads documents and generates sense signals correesponding to data on the documents. A transition signal is generated at the leading edge of a sense signal to provide a first reading of the document. The transition signal is converted into an error signal when a second reading of the document indicates that the sense signal does not coincide with a column timing pulse.

Figure 1:
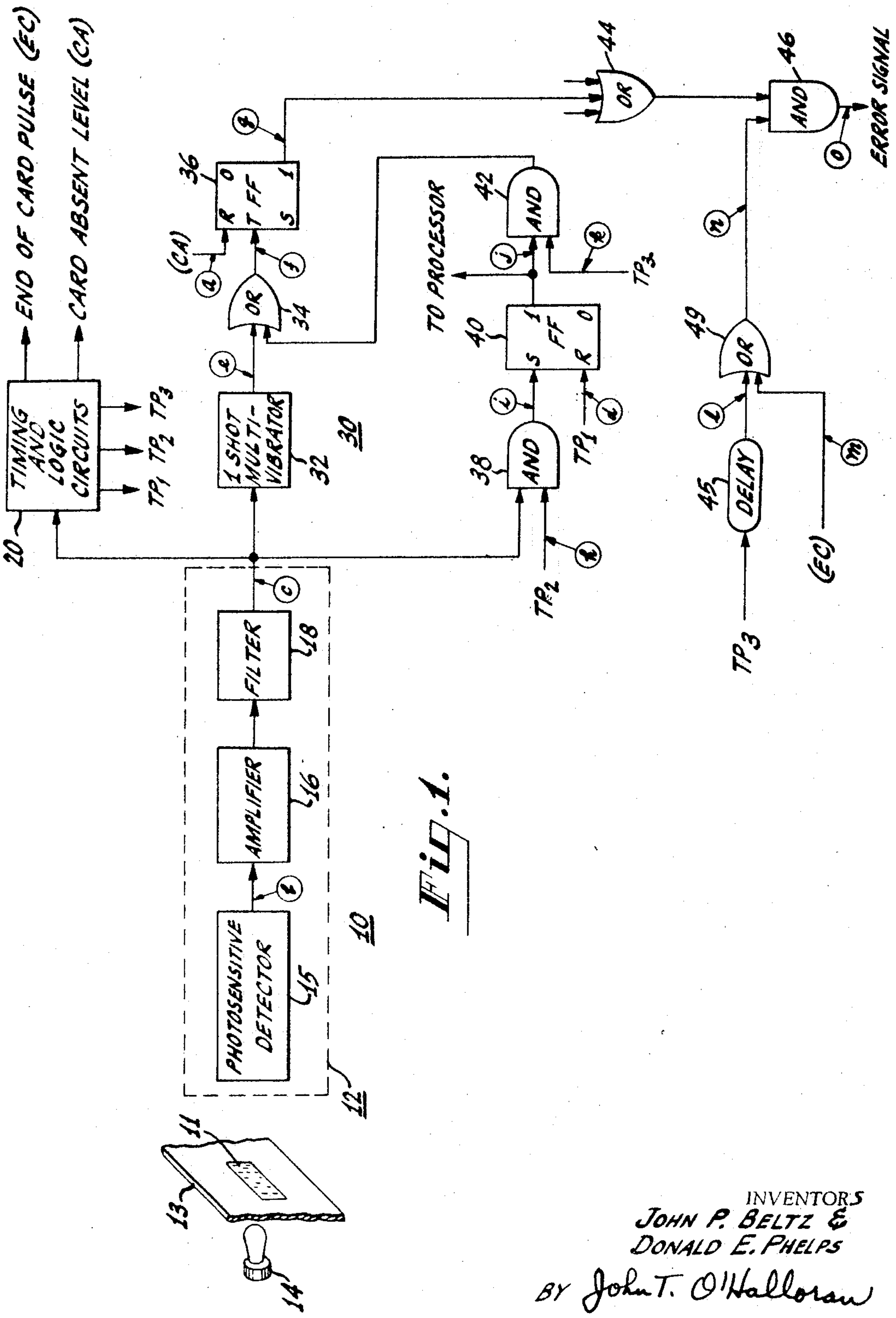

In prior art optical readers, a common method of checking the reliability of the reading done by such readers is to independently read the documents twice. To perform such a double reading of the documents, two read stations are incorporated into the readers and their output is periodically compared to detect differences. If a difference occurs, an error is indicated. Such readers are relatively expensive because of the second read station provided.

Accordingly, it is an object of this invention to provide a new and improved optical reader which gives reliable reading at low cost.

It is another object of this invention to provide an optical reader which effectively reads information twice without the necessity of providing two read stations.

It is a further object of this invention to provide an optical reader incorporating double detection into its operation for reliable reading.

An optical reader in accordance with the invention effectively reads each information datum on a document twice without using two read stations. The double readings may be either sequential or simultaneous. The first reading detects the fact that an information datum does occur on a document. The second reading ascertains whether or not the informatiton datum occurs at the proper time, and hence proper place on the document. If not, the optical reader produces an error signal.

In a physical exemplification of the invention, a first reading of the document occurs when the leading edge of a sense signal, produced by an information datum on the document, triggers a triggerable bistable device to one of its stable states to produce a transition signal. The second reading occurs when the output of the read station is sampled by periodic timing pulses synchronized with each column of the document being read. If a sense signal coincides with a column timing pulse, an output read signal is generated. The read signal, in addition to providing the useable output of the reader, is also utilized to trigger the bistable device back to its other stable state to stop the generation of the transition signal. In the absence of the coincidence of a sense signal and a column timing pulse, the bistable device continues to generate the transition signal. A periodic pulse samples the bistable device to convert the transition signal into an error signal if the bistable device is operating in its said one state. Thus, once the leading edge of an information datum is detected as occurring on a document, the information datum must also be detected as occuring in its correct position or else an error signal is generated. Conversely, if an information datum is detected as occurring in its correct positition but no leading edge of the information datum is detected, then an error signal is also generated. This is a form of double reading which provides the same reading reliability, but with less expense, as prior art optical readers which incorporate two reading stations therein.

Figure 2:
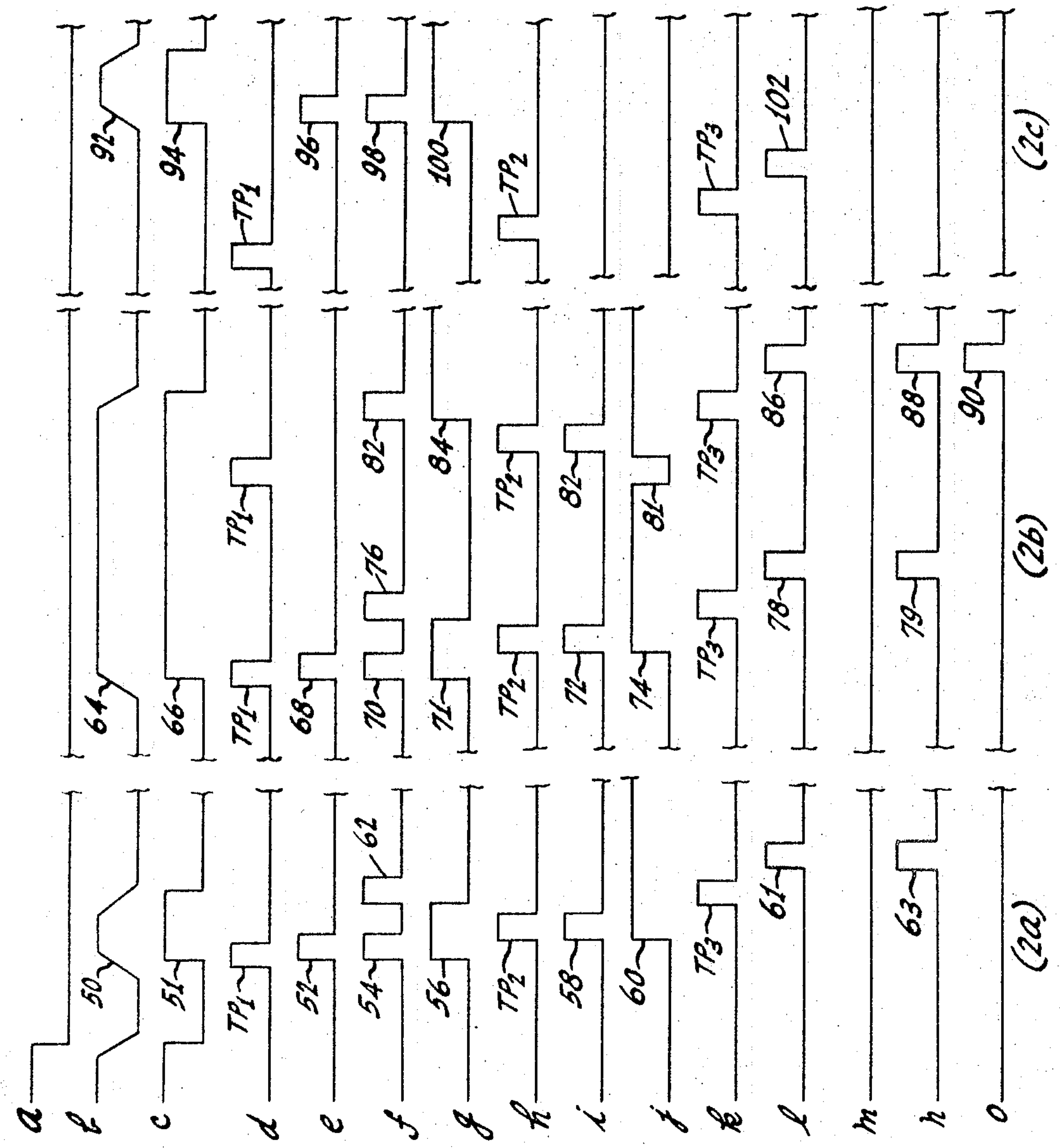

In the drawing:

FIGURE 1 is a schematic circuit diagram of a portion of an optical reader that incorporates a reliability check circuit in accordance with the invention; and, FIGURE 2 composed of FIGURES 2*a* through 2*c*, are timing diagrams which are helpful in explaining the operation of the circuit in FIGURE 1.

Referring now to FIGURE 1, an optical reader 10 reads coded documents 11 that are transported at a substantially constant velocity past a reading stattion 12 by means of a document transport or document feed mechanism 13. The coded documents may, for example, be punched cards, wherein light is transmitted through information data punches in the card; mark sense cards, wherein light is reflected from information data marked on the card; or the like. For convenience, the reader 10 will be described as a punched card reader although the invention is applicable to other optical readers. A standard punched card may, for example, be 80 columns long and 12 rows high with information datum appearing in the form of punches at the intersection of the columns and rows. With such a punched card, a light source such as a lamp 14 is positioned on one side of the card 11 and the reading station is positioned on the other. A light beam generated by the lamp 14 penetrates through a card 11, if a punch occurs therein. The reading station 12 includes a photosensitive detector 15, such as a phototransistor, to detect the light beam and produce a sense signal. The sense signal produced by the detector 15 is amplified in an amplifier 16 and then filtered by a filter 18. In the case of a serial reader, the reading station 12 includes a detector 15, an amplifier 16 and a filter 18 for each of the twelve rows in the card. For convenience only one of each circuit is shown in FIGURE 1.

The amplified and filtered sense signal produced by the read station 12 is applied to a timing and logic circuit 20. The timing and logic circuits 20 produce a plurality of timing pulses that are synchronized with the movement of the card past the reading station 12. Thus, with a punched card 11, the timing circuits 20 produce a plurality of trains of pulses that correspond to the columns in the card. For example, a pulse from a pulse train labeled $TP_1$ occurs immediately prior to each column of a card 11, as referenced from the leading edge of the card. A pulse from a pulse train labeled $TP_2$ occurs substantially in the middle of each column of the card 11, whereas a pulse from a pulse train labeled $TP_3$ occurs immediately after each column. The circuits 20 may, for example, be synchronized to generate these trains of pulses when the leading edge of each document is detected at the read station 12. The logic circuit 20 also produces a signal denoting the absence and presence of a card at the reading station 12. Thus, a card absent (CA) signal exhibits a high level when a card 11 is absent from the reading station 12 and a low level when a card 11 is present thereat. As the end of each card 11 passes the reading station 12, the timing circuit 20 produces an end of card (EC) pulse.

The output of the read station 12 is also applied to a reliability checking circuit 30, in accordance with the invention. There is one reliability check circuit 30 for each row in a serial reader but for convenience only one is shown in FIGURE 1. The reliability checking circuit 30 includes a one-shot multivibrator 32 which is coupled to the filter 18 output in the read station 12 to be triggered to produce an output pulse whenever the leading edge of an information datum causes a sense signal to be generated in the read station 12. The multivibrator 32 is coupled through an OR gate 34 to the trigger input terminal (T) of a triggerable bistable device such as the flip-flop 36. At the end of every card, the triggerable flip-flop 36 is switched to its reset operating state, and held reset, by a high level (CA) signal applied from the timing circuit 20 to the reset terminal (R) of the flip-flop 36. When triggered by an output pulse from the one-shot multivibrator 32, the bistable device 36 is triggered to its set (S) operating state to produce a transition signal from its "1" output terminal. Successive inputs to the trigger terminal (T) switches the device 36 back to its reset state, then to its set state, etc.

The ouput of the read station 12 is also coupled to one input of a two-input AND gate 38. The other input to the AND gate 38 comprises the train of column timing pulses $TP_2$ generated in the timing circuit 20. When a sense signal coincides with a column timing pulse $TP_2$, the gate 38 is activated and the output of the AND gate 38 is coupled to the set terminal (S) of a bistable flip-flop 40. The flip-flop 40 is initially reset by a pre-column timing pulse $TP_1$ that occurs prior to the column timing pulse $TP_2$. The "1" output terminal of the flip-flop 40 provides a read output signal that is the useable output of the reader 10. The read signal is applied to a data processor (not shown) in the data processing system in which the optical reader 10 is utilized. The "1" output terminal of the flip-flop 40 is also coupled to apply the read output signal to one input of an AND gate 42. The other input to the gate 42 comprises a post-column timing pulse $TP_3$, which occurs after the column timing pulse $TP_2$. Thus, the flip-flop 40 is sampled at the end of every column to activate the AND gate 42 if the flip-flop 40 is set. The output of the AND gate 42 is also coupled through the OR gate 34 so as to trigger the triggerable flip-flop 36 when an output read signal has been generated by the flip-flop 40.

The "1" output terminal of the bistable device 36, as well as similar terminals from the other 11 bistable devices in a serial card reader, are coupled to an OR gate 44 to provide one input to an output AND gate 46 when any of the devices 36 are set. The other input to the AND gate 46 comprises either a delayed timing pulse $TP_3$, which is delayed in a delay circuit 48 before application through an OR gate 49 to the AND gate 46, or an end of card pulse (EC) which is applied directly through the OR gate 49. If the AND gate 46 is activated by either pulse, the transition signal generated by the bistable device 36 is converted into an error signal.

Referring now to FIGURE 2, the timing diagrams of FIGURE 2 will be utilized, in conjunction with the circuit diagram of FIGURE 1, to describe the operation of the optical reader 10. The circle reference letters labeling the lines in FIGURE 2 are repeated in the appropriate locations of FIGURE 1 to show the origin of these signals.

FIGURE 2*a* is the timing diagram that occurs during the normal reading of a punched card 11. When the leading edge of a card is detected by the read station 12, the card absent signal (CA) produced by the timing circuits 20 drops to a low level as shown in line *a* of FIGURE 2*a*. The reset hold signal previously applied to reset terminal (R) of the triggerable bistable device 36 is therefore removed. The timing circuits 20 produce trains of timing pulses that are synchronized with the speed of the card feed mechanism 13 that feeds the cards 11 to the reading station 12. When a punch is detected in a card, the photosensitive detector produces a sense signal 50 as shown in line *b* of FIGURE 2*a*. The sense signal 50 is amplified and filtered to provide a slightly delayed but sharp sense pulse 51 as shown in line *c* of FIGURE 2*a*. The timing generator 20 produces a timing pulse $TP_1$ immediately prior to a column on the card 11. The timing pulse $TP_1$ resets the flip-flop 40 and prepares it for the reception of a sense signal. The leading edge of the sense signal 51 causes the one-shot multivibrator 32 to produce an output pulse 52, as shown in line *e*. The output pulse from the multivibrator 32 provides a trigger pulse 54 (line *f*) to trigger the bistable device 36 from its reset state to its set state. The bistable device 36 produces a transition signal 56 as shown in line *g* of FIGURE 2*a*. In the approximate center of a column, a timing pulse $TP_2$ is produced as shown in line *h* of FIGURE 2*a*. The timing pulse $TP_2$ occurs coincidentally with the sense signal 52 from the read station 12 and consequently the AND gate 38 is activated to produce an output pulse 58. The output pulse 58 of the AND gate 38 sets the previously reset flip-flop 40 and produces an output read signal 60 from the "1" terminal thereof as shown in line *j* of FIGURE 2*a*. This output read signal 60 comprises the useful output of the reader 10 and is applied to a data processor for further processing. The output read signal 60 also enables an AND gate 42.

When a timing pulse $TP_3$ arrives at the end of a column, the AND gate 42 is activated to produce a triggering pulse 62 (line *f*) which triggers the bistable device 36 from its set state to its reset state. Consequently, the transition signal 56 previously produced by the "1" output terminal of the triggerable flip-flop 36 is removed. The timing pulse $TP_3$ is delayed in the delay circuit 48 to produce a delayed pulse 61 (line *l*) which comprises a sampling pulse 63 applied to sample the output AND gate 46. No error signal results because the transition signal 56 is absent at this time due to the resetting of the device 36. It is assumed that the corresponding bistable devices 36 in other rows in the reader are also reset so consequently no error signal is produced.

Referring now to FIGURE 2*b*, there is illustrated the timing diagram when a punched card 11 has a web torn from between two punched holes. In such case, the sense signal 64 in line *b* of FIGURE 2*b* is appreciably longer than would be the case with a single punched hole. The leading edge of the filtered sense signal 66 fires the multivibrator 32 to produce an output pulse 68 that functions as a trigger input pulse 70 to trigger the device 36 to its set state. The setting of this device 36 produces a transition signal 71 from the "1" output terminal thereof. When a timing pulse $TP_2$ arrives, the AND gate 38 is activated to produce an output pulse 72 because the sense signal 66 is coincident therewith. The activation of the AND gate 38 sets the flip-flop 40 to produce a read output signal 74 from the "1" terminal thereof. The read signal 74 also enables the AND gate 42 which is activated by the timing pulse $TP_3$. The activation of the AND gate 42 produces a trigger pulse 76 (line *f*) which resets the device 36 and blocks the further generation of a transition signal 71. A delayed $TP_3$ pulse 78 applies a sampling pulse 79 to the output AND gate 46 but no error signal is generated.

Since the sense signal 66 does not disappear between punches because of the torn web, no leading edge of information data is available at the next column to trigger the bistable device 36 from its reset state. The sense signal 66 is therefore available when a column timing pulse $TP_2$ is generated. Therefore, the gate 38 is activated to produce an output pulse 80. The pulse 80 sets the flip-flop 40 to produce a read signal 81 since the flip-flop 40 had been previously reset by a pre-column timing pulse $TP_1$. Therefore, when the post-column timing pulse $TP_3$ arrives, the gate 42 is activated to produce a trigger pulse 82 (line *f*) which sets the bistable device 36. The bistable device 36 produces a transition signal 84. At the time the delayed timing pulse $TP_3$ 86 produces a sampling pulse 88, the AND gate 46 is already enabled by the transition signal 84 and therefore an error signal 90 is generated. Thus, the transition signal 84 is converted into an error signal 90 when a torn web appears on the card 11.

In FIGURE 2*c* there is illustrated the timing sequence that occurs when a document is skewed, is malformed to the degree that the columns are not aligned correctly, or has been altered due to adverse environmental conditions. Under this condition timing pulses $TP_1$, $TP_2$, and $TP_3$ as well as a delayed timing pulse $TP_3$ may be generated prior to the arrival of the information datum at the reading station 12. Consequently, the flip-flop 40 is reset by the pulse $TP_1$ but neither of the gates 38 and 42 are activated because no sense signal is generated coincident with the timing pulses. At the time a sense signal 92 and its amplified and filtered version 94 are generated, the mulivibrator 32 is fired to generate a pulse 96 which functions as a trigger pulse 98 to set the bistable device 36. The bistable device 30 generates a transition signal 100. However, no error signal is generated because the pulse 102 derived from the delayed timing pulse $TP_3$ is generated previous to the transition signal 100.

In the next column, the transition signal is converted into an error signal. This is so because if the card 11 is still skewed, a delayed timing pulse $TP_3$ will activate the output AND gate 46 to convert the transition signal into an error signal. Alternatively, if the card is not skewed, the sense signal produced by an information datum generates a first trigger pulse to reset the bistable device 36. However, the second reading due to the timing pulse $TP_2$ causes the bistable device 36 to be set once again producing an error signal when the gate 46 is sampled by a delayed timing pulse $TP_3$. If the skew occurs in the last column so that no timing pulses are generated after the condition illustrated in FIGURE 2*c*, then the end of card (EC) pulse converts the transition signal into an error signal.

Thus, in accordance with the invention, a double reading of each document is performed by an optical reader. The first reading detects the leading edge of an information datum on the document and the second reading checks to see if this information datum is coincident with a column timing pulse to locate information datum on the document correctly. Such a double reading is accomplished in an inexpensive manner without providing two read stations or in any way delaying the reading of the documents.

What is claimed is:

1. In an optical reader for reading documents having data recorded thereon in columns, said reader including means for generating sense signals representing said data, and means for generating column timing pulses corresponding to the columns in a document, the combination comprising, a generator for generating a transition signal at the leading edge of a sense signal to provide a first read indication of said document, means for generating an output read signal when said sense signal coincides with one of said column timing pulses to provide a second read indication of said document to check said first read signal, and means for applying said output signal to deactivate said generator so as to block the generation of an error signal from said transition signal.

2. In an optical reader for reading documents having data recorded thereon in columns, said reader including means for generating sense signals representing said data, and means for generating column timing pulses corresponding to the columns in a document, the combination comprising, means for generating a transition signal at the leading edge of a sense signal to provide a first read indication of said document, means for sampling said sense signal to generate an output read signal when said sense signal coincides with one of said column timing pulses to provide a second read indication of said document, and means for converting said transition signal into an error signal in the absence of the generation of said output read signal.

3. In an optical reader for reading documents having data recorded thereon in columns, said reader including a photosensitive detector for generating sense signals representing said data, and means for generating column timing pulses corresponding to the columns in a document, the combination comprising, means coupled to said detector for generating a transition signal at the leading edge of a sense signal, and means for converting said transition signal into an error signal in the absence of the coincidence of a column timing pulse with said sense signal.

4. In an optical reader for reading documents having data recorded thereon in columns, said reader including a photosensitive detector for generating sense signals representing said data, and means for generating column timing pulses corresponding to the columns in a document, the combination comprising, a generator coupled to said detector to be activated to generate a transition signal at the leading edge of a pulse sense signal, and means for deactivating said generator when said pulse sense signal coincides with one of said column timing pulses.

5. In an optical reader for reading documents having data recorded thereon in colums, said reader including means for generating sense signals representing said data, and means for generating column timing pulses corresponding to said columns, the combination comprising, means for generating a transition signal at the leading edge of a sense signal to provide a first read indication of said document, and means for converting said transition signal into an error signal when a second reading of said document indicates the absence of the coincidence of said sense signal with a column timing pulse.

6. In an optical reader for reading documents having data recorded thereon in columns, said reader including means for generating sense signals representing said data, and means for generating a timing pulse for each of said columns, the combination comprising, a bistable device having two stable states of operation, means for coupling said bistable device to be switched from one stable state to the other to generate a transition signal upon the occurrence of the leading edge of a sense signal, gate means for generating a trigger signal when aid sense signal coincides with one of said column timing pulses, and means for applying said trigger signal to switch said bistable device from said other stable state to said one stable state to remove said transition signal.

7. In an optical reader for reading documents having data recorded thereon in columns, said reader including means for generating sense signals representing said data, and means for generating a timing pulse for each of said columns, the combination comprising, a bistable device having two stable states of operation, means for coupling said bistable device to be switched from one stable state to the other to generate a transition signal upon the occurrence of the leading edge of a sense signal, gate means for generating a trigger signal when said sense signal coincides with one of said column timing pulses, means for applying said trigger signal to switch said bistable device from said other stable state to said one stable state to remove said transition signal, and means for periodically sampling the output of said bistable device to convert a transition signal into an error signal when a transition signal is present during the sampling time.

8. In an optical reader for reading documents having data recorded thereon in columns, said reader including a photosensitive detector for generating sense signals representing said data, and a timing generator for generating a column timing pulse and a post-column timing pulse for each of said columns, the combination comprising, a bistable device having two stable states of operation, means for coupling said bistable device to said photosensitive detector to be switched from one stable state to the other to generate a transition signal upon the occurrence of the leading edge of a sense signal, a gate coupled to said detector for generating a trigger signal when said sense signal coincides with one of said column timing pulses, means for applying said trigger signal to switch said bistable device from said other stable state to said one stable state to remove said transition signal, a gate coupled to sample said bistable device, and means for applying a post-column timing pulse to said gate to convert a transition signal into an error signal in the absence of said trigger signal.

References Cited

UNITED STATES PATENTS

| | | |
|---|---|---|
| 3,067,934 | 12/1962 | Amacher et al. |
| 3,173,000 | 3/1965 | Johnson et al. |
| 3,184,581 | 5/1965 | Willoughby. |
| 3,238,357 | 3/1966 | Minka. |
| 3,341,691 | 9/1967 | Modersohn et al. |
| 3,351,744 | 11/1967 | Masterson. |

DARYL W. COOK, Primary Examiner